(12) United States Patent
Sinanoglu

(10) Patent No.: US 12,387,024 B2
(45) Date of Patent: Aug. 12, 2025

(54) SYSTEM, METHOD, COMPUTER-ACCESSIBLE MEDIUM, AND CIRCUIT FOR CRIPPLING THE ORACLE IN LOGIC LOCKING

(71) Applicant: New York University in Abu Dhabi Corporation, Abu Dhabi (AE)

(72) Inventor: Ozgur Sinanoglu, Abu Dhabi (AE)

(73) Assignee: New York University in Abu Dhabi Corporation, Abu Dhabi (AE)

(*) Notice: Subject to any disclaimer, the term of this patent is extended or adjusted under 35 U.S.C. 154(b) by 383 days.

(21) Appl. No.: 17/923,674

(22) PCT Filed: May 7, 2021

(86) PCT No.: PCT/IB2021/053917
§ 371 (c)(1),
(2) Date: Nov. 7, 2022

(87) PCT Pub. No.: WO2021/224886
PCT Pub. Date: Nov. 11, 2021

(65) Prior Publication Data
US 2023/0177245 A1 Jun. 8, 2023

Related U.S. Application Data

(60) Provisional application No. 63/021,374, filed on May 7, 2020.

(51) Int. Cl.
*G06F 30/30* (2020.01)
*G06F 21/00* (2013.01)
*G06F 30/337* (2020.01)

(52) U.S. Cl.
CPC ............ *G06F 30/337* (2020.01); *G06F 30/30* (2020.01); *G06F 21/00* (2013.01)

(58) Field of Classification Search
None
See application file for complete search history.

(56) References Cited

U.S. PATENT DOCUMENTS 10,153,769 B2 * 12/2018 Sinanoglu ............. G06F 30/392
11,657,127 B2 * 5/2023 Bhunia ................. G06F 21/602
713/189

(Continued)

FOREIGN PATENT DOCUMENTS

| CN | 110020558 A | 7/2019 |
| WO | 2018/057525 A1 | 3/2018 |
| WO | 2019/178255 A1 | 9/2019 |

OTHER PUBLICATIONS

G. Karypis et al., "Multilevel Hypergraph Partitioning: Applications in VLSI Domain," IEEE trans. on Very Large Scale Integration (VLSI) Systems, vol. 7, No. 1, Mar. 1999, pp. 69-79. (Year: 1999).*

(Continued)

*Primary Examiner* — Leigh M Garbowski
(74) *Attorney, Agent, or Firm* — HUNTON ANDREWS KURTH LLP

(57) ABSTRACT

Exemplary system, method, and computer-accessible medium for protecting at least one logic-locked integrated circuit (IC) design can include, for example, receiving a request(s), and swapping a correct key which is configured to unlock the logic-locked IC design(s) with an incorrect key which is configured to corrupt an output(s) of the logic-locked IC design(s) after receipt of the request(s). The request(s) can be a test access request(s). The correct key can be utilized when the logic-locked IC design(s) can be initially powered on. The correct key can be swapped with the incorrect key using multiplexer(s) or register(s). In addition, exemplary system, method, and computer-accessible medium can be provided for logic-locking a logic design by, randomly replacing randomly-selected inverters (Continued)

in the logic design with XOR or XNOR key-gates, and inserting XOR or XNOR key-gates randomly in randomly-selected locations in the logic design where there is no inverter.

5 Claims, 7 Drawing Sheets

(56) References Cited

U.S. PATENT DOCUMENTS

| | | | |
|---|---|---|---|
| 2010/0284539 A1 | 11/2010 | Roy et al. | |
| 2019/0258766 A1* | 8/2019 | Wang | H01L 21/02107 |
| 2020/0065456 A1 | 2/2020 | Tehranipoor et al. | |

OTHER PUBLICATIONS

Y.-W. Lee et al., "Improving Logic Obfuscation via Logic Cone Analysis," 2015 16th Latin-American Test Symposium (LATS), 6 pages. (Year: 2015).*
M. Yasin, et al., "A Brief History of Logic Locking," Cham: Springer International Publishing, 2020, pp. 17-31.
J. Rajendran, et al., "Security analysis of logic obfuscation," in Proc. 49th Annu. Design Automation Conf (DAC), Jun. 2012, pp. 83-89.
"Intel's 22-nm trigate transistors exposed," 2012. [Online]. Available: http://electroiq.com/chipworks- real- chips-blog/2012/04/24/intels-22-nm-trigate-transistors-exposed.
"iPhone 5 A6 SoC reverse engineered, reveals rare hand-made custom CPU, and tri-core GPU," 2012. [Online]. Available: http://www.extremetech.com/computing/136749-iphone-5-a6-soc-reverseengineered- reveals-rare-hand-made-custom/-cpu-and-a-tri-core-gpu.
R. Karmakar et al., "Encrypt Flip-Flop: A Novel Logic Encryption Technique For Sequential Circuits," arXiv preprint arXiv:1801.04961, 2018.
U. Guin et al., "Robust design-for-security architecture for enabling trust in IC manufacturing and test," TVLSI, vol. 26, No. 5, pp. 818-830, 2018.
X. Wang et al., "Secure scan and test using obfuscation throughout supply chain," TCAD, vol. 37, No. 9, pp. 1867-1880, 2017.
R. Karmakar et al., "A Scan Obfuscation Guided Design-for-Security Approach For Sequential Circuits," TCAS II: Express Briefs, 2019.
L. Alrahis et al., "ScanSAT: Unlocking Static and Dynamic Scan Obfuscation," TETC, pp. 1-1, 2019.
M. Yasin et al., "On improving the security of logic locking," TCAD, vol. 35, No. 9, pp. 1411-1424, 2016.
P. Subramanyan et al., "Evaluating the security of logic encryption algorithms," in HOST. IEEE, 2015, pp. 137-143.
K. Shamsi et al., "AppSAT: Approximately deobfuscating integrated circuits," in HOST. IEEE, 2017, pp. 95-100.
Y. Shen and H. Zhou, "Double DIP: Re-evaluating security of logic encryption algorithms," in GLSVLSI. ACM, 2017, pp. 179-184.
X. Xu et al., "Novel bypass attack and BDD-based tradeoff analysis against all known logic locking attacks," in CHES. Springer, 2017, pp. 189-210.
D. Sirone and P. Subramanyan, "Functional analysis attacks on logic locking," in DATE. IEEE, 2019, pp. 936-939.
M. El Massad et al., "Reverse engineering camouflaged sequential circuits without scan access," in ICCAD. IEEE/ACM, 2017, pp. 33-40.
M. Yasin et al., "Removal Attacks on Logic Locking and Camouflaging Techniques," TETC, pp. 1-1, 2017.
F. Yang et al., "Stripped Functionality Logic Locking With Hamming Distance-Based Restore Unit (SFLL-hd)-Unlocked," TIFS, vol. 14, No. 10, pp. 2778-2786, 2019.
M. Yasin et al., "SARLock: SAT attack resistant logic locking," in HOST. IEEE, 2016, pp. 236-241.
Y. Xie and A. Srivastava, "Anti-sat: Mitigating sat attack on logic locking," TCAD, vol. 38, No. 2, pp. 199-207, 2019.
M. Yasin et al., "Provably-secure logic locking: From theory to practice," in CCS. ACM, 2017, pp. 1601-1618.
J. Roy et al., "Ending Piracy of Integrated Circuits," Computer, vol. 43, No. 10, pp. 30-38, 2010, submitted as DATE08, 2008 EDAA.
J. Rajendran et al., "Fault analysis-based logic encryption," TCOMP, vol. 64, No. 2, pp. 410-424, 2015.
A. Sengupta, M. Nabeel, N. Limaye, M. Ashraf, and O. Sinanoglu, "Truly stripping functionality for logic locking: A fault-based perspective," IEEE Trans. Comput.-Aided Design Integr. Circuits Syst., pp. 1-1, 2020.
M. Yasin et al., "Activation of logic encrypted chips: Pre-test or posttest?" in DATE. EDA Consortium, 2016, pp. 139-144.
Written Opinion and Search Report for International Patent Application No. PCT/IB2021/053917 mailed on Jul. 27, 2021.
Rajit Karmakar et al. "Encrypt Flip-Flop: A Novel Logic Encryption Technique For Sequential Circuits," Jan. 2018 [retrieved from internet on Jul. 21, 2021], <URL: https://arxiv.org/pdf/1801.04961.pdf>.
Knechtel, J. et al., "Protect Your Chip Design Intellectual Property: An Overview", Proceedings of the International Conference on Omni-Layer Intelligent Systems (COINS'I 9), May 2019, pp. 211-216.
Shamsi, K. et al., "On the Approximation Resiliency of Logic Locking and IC Camouflaging Schemes", IEEE Transactions on Information Forensics and Security, vol. 14, No. 2, Feb. 2019.
United Arab Emirates Ministry of Economy, Office Action issued in Application No. P6002311/2022 dated Dec. 13, 2024, 8 pages.
United Arab Emirates Ministry of Economy, Search report issued in Application No. P6002311/2022 dated Dec. 13, 2024, 3 pages.
Notification Concerning Transmittal of International Preliminary Report on Patentability (Chapter I of the Patent Cooperation Treaty) dated Nov. 17, 2022 for International Patent Application No. PCT/IB2021/053917.

* cited by examiner

SYSTEM, METHOD, COMPUTER-ACCESSIBLE MEDIUM, AND CIRCUIT FOR CRIPPLING THE ORACLE IN LOGIC LOCKING

CROSS-REFERENCE TO RELATED APPLICATION(S)

This application is a U.S. National Phase Patent Application and claims priority from International Patent Application No. PCT/IB2021/053917, filed on May 7, 2021 that published as International Patent Publication No. WO 2021/224886 on Nov. 11, 2021, which claims the benefit and priority from U.S. Provisional Patent Application No. 63/021,374, filed on May 7, 2020, the entire disclosures of which are incorporated herein by reference.

FIELD OF THE DISCLOSURE

The present disclosure relates generally to circuit schemes, and more specifically. to exemplary embodiments of exemplary system, method, computer-accessible medium, and circuit for performing logic locking on a logic design and crippling the oracle to protect the logic locking key from attacks.

BACKGROUND INFORMATION

Logic locking can protect hardware designs from intellectual property ("IP") piracy and overbuilding. (See. e.g., Reference 1). Such configurations can use a key to drive the design along with the inputs: a correct key can ensure correct functionality while an incorrect key may corrupt the functionality. The key can physically be stored in a tamper-proof memory on the chip throughout its lifetime. Additionally, the key can be retained on the chip even when the chip is powered off. Manufactured chips may therefore be useless until the correct key has been loaded on the chip by a trusted entity, such as the design house.

Logic locking can deliver protection when its correct key remains safe. Attacks on logic locking can target the retrieval of the correct key, which may not only unlock chips but also can be used to reveal the functionality of the design. Most of these attacks can use two pieces of information (see. e.g., Reference 2): (i) The netlist of the logic-locked design (e.g., the untrusted foundry can reverse engineer the GDSII layout to obtain it: an untrusted end-user may reverse engineer a chip by depackaging, delayering, and imaging to obtain it (see. e.g., References 3 and 4) and (ii) a working chip that is used as oracle (e.g., it can be obtained from the market).

Attacks generally use the netlist for simulation and generation of input patterns that can reveal information about the key and the oracle to obtain the output of the chip for the generated input patterns. The oracle may enable an attacker to apply input patterns not only from the primary inputs but also through the test interface (e.g., the scan chains) that may provide deep access into the flip-flops of the design.

The scan chains of a design can facilitate the high-quality testing of chips for manufacturing defects. Though the manufacturing testing takes place long before the chips are deployed into the market, scan chains are not disabled upon the completion of manufacturing testing. They can still be used for re-testing the chips and for debugging mission mode failures. Attackers may misuse this test access availability in their oracle to retrieve the logic locking key. Various countermeasures to protect scan chains have been employed (see. e.g., References 1-4), but they all fall short of protecting the chips. (See. e.g., Reference 9).

Thus, it may be beneficial to provide an exemplary system, method, computer-accessible medium, and circuit for performing logic locking on a logic design and crippling the oracle to protect the logic locking key from attacks, which can overcome at least some of the deficiencies described herein above.

SUMMARY OF EXEMPLARY EMBODIMENTS

To that end, exemplary system, method, and computer-accessible medium can be provided for protecting at least one logic-locked integrated circuit (IC) using which, for example, it is possible to receive a request(s), and swap a correct key configured to unlock a logic-locked IC(s) with an incorrect key configured to corrupt an output(s) of the IC(s) after receipt of the request(s). The request(s) can be a test (e.g., scan chains) access request(s). The correct key can be utilized when the IC(s) can be initially powered on. The correct key can be swapped with the incorrect key using multiplexer(s) or register(s). The integrated circuit can be logic-locked by using XOR gate(s) or XNOR gate(s) controlled by key inputs.

A logic-locked integrated circuit (IC) can include, for example, a register(s) storing (i) a correct key(s) configured to enable a substantially correct functionality of the IC and (ii) an incorrect key(s) configured to disable the substantially correct functionality of the IC, and circuitry configured to swap the correct key(s) with the incorrect(s) key(s). Alternatively, an incorrect key(s) can be obtained on the chip via register reset operations or by allowing the user of the chip (e.g., oracle) to load their own key.

Exemplary system, method, computer-accessible medium, and circuit, according to an exemplary embodiment of the present disclosure, can include a procedure for receiving at least one request; and a procedure for swapping a correct key which can be configured to unlock at least one logic-locked IC with an incorrect key which can be configured to corrupt at least one output of the at least one logic-locked IC after the receipt of the at least one request.

In exemplary system, method, computer-accessible medium, and circuit, according to an exemplary embodiment of the present disclosure, the at least one request can be at least one test access request.

In exemplary system, method, computer-accessible medium, and circuit, according to an exemplary embodiment of the present disclosure, the computer arrangement can further be configured to utilize the correct key when the at least one IC is initially powered on.

In exemplary system, method, computer-accessible medium, and circuit, according to an exemplary embodiment of the present disclosure, the computer arrangement can be configured to swap the correct key with the incorrect key using at least one of at least one multiplexer or at least one register.

In exemplary system, method, computer-accessible medium, and circuit, according to an exemplary embodiment of the present disclosure, the computer arrangement can be configured to control the at least one of at least one XOR key-gate or at least one XNOR key-gate by the correct key, which consists of a plurality of key bits.

In exemplary system, method, computer-accessible medium, and circuit, according to an exemplary embodiment of the present disclosure, the computer arrangement can be configured to randomly select at least one first location at a first portion in a logic design which can include first inverters; randomly select at least one second location at a second portion in the logic design which can exclude at least one second inverter; randomly partition the at least one first location into at least two first sets, and the at least one second location into at least two second sets; replace at least first one of the first inverters in the logic design in at least first one of the first sets with at least one XOR key-gate; replace at least second one of the first inverters in the logic design in at least second one of the first sets with at least one XNOR key-gate; insert the at least one XNOR key-gate in the logic design in at least first one of the second sets; and insert the at least one XOR key-gate in the logic design in at least second one of the second sets thereby modifying the at least one logic-locked IC.

In exemplary system, method, computer-accessible medium, and circuit, according to an exemplary embodiment of the present disclosure, at least one first input of the at least one XOR key-gate or at least one first input of the at least one XNOR key-gate can be driven by a net in the logic design; and at least one second input of the at least one XOR key-gate or at least one second input of the at least one XNOR key-gate can be driven by logic locking key bits.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
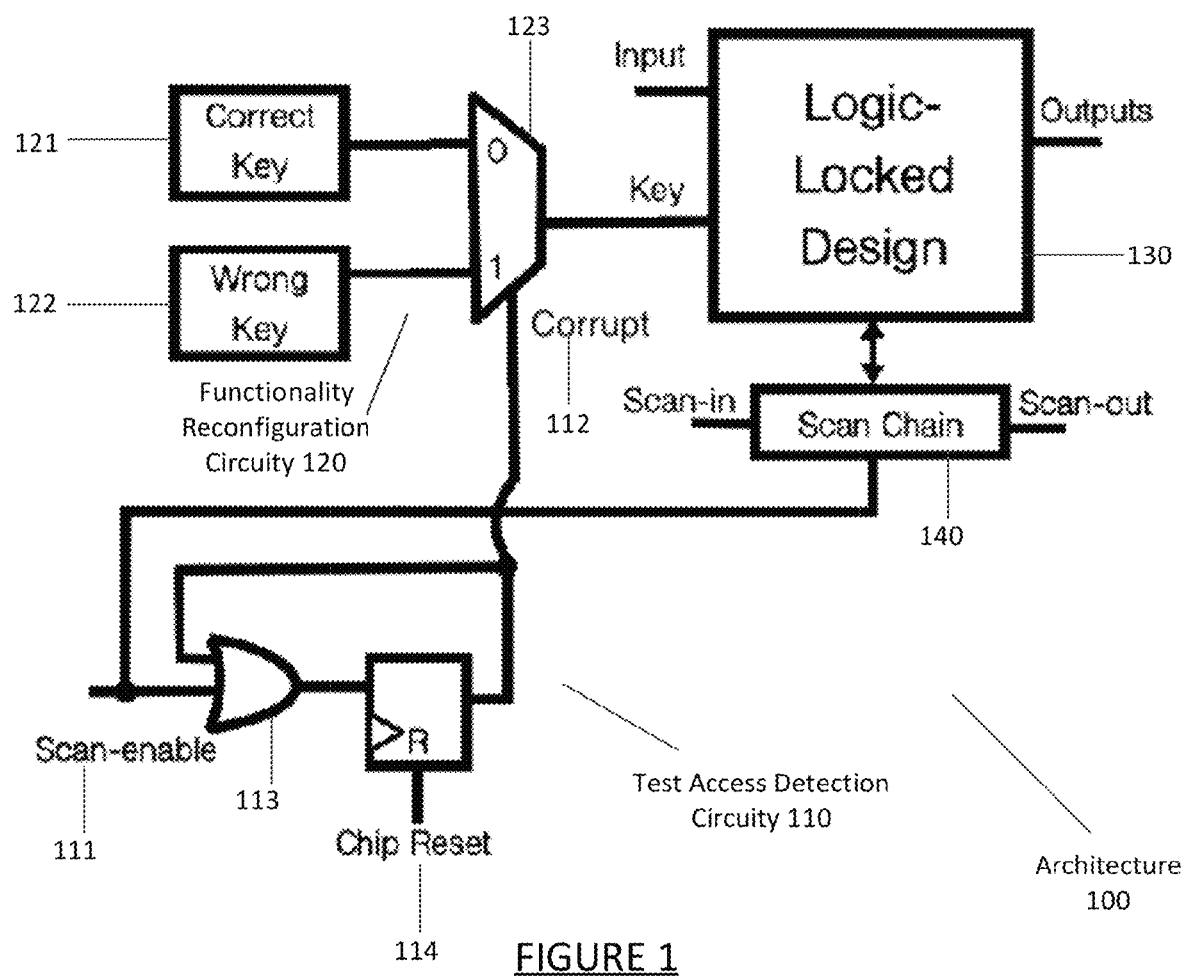
FIG. 1 is a schematic diagram of an exemplary logic-locking architecture according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Test access, and in particular, the scan chains of a chip can be used to test or debug the chip, or it can be misused for leaking information as can be the case in attacking a logic-locked chip. As part of IEEE standards, every chip can have an explicit signal called the scan-enable signal that can be used to control the scan chains: any activity on this signal may imply access to the scan chains. Even though it can be difficult to identify the intent of the chip user, it can be quite easy to detect test access. As per IEEE standards, the scan-enable signal can be set HIGH either by an external input to the chip directly or through an internal controller circuit on the chip in order to configure all the scan chains of the chip into load/unload mode. The scan-enable signal can be kept at LOW when the chip is in its mission (functional) mode. As attacks on logic locking can heavily rely on the loading and unloading of the scan chains of the chip, when the scan-enable signal is set to HIGH, it can be interpreted as a threat for the logic locking key.

Logic locking can be protected from attacks that use test access in oracles. In particular, exemplary circuitry can be added around a logic-locked design that can be used to detect test access and reconfigure (e.g., corrupt) chip functionality upon detection (e.g., immediately or at some point after or before detection). An exemplary logic-locked design can be configured into an incorrect mode (or incorrect functionality) by replacing the correct key with an incorrect key. Thus, the correct key and mode (or functionality) can be isolated regardless of whether the intent of the person that accessed the test access is good or malicious. Any attack that uses the scan chains in the oracle can obtain corrupted information as the oracle may no longer operate with the correct mode (or functionality). Therefore, any attack can only recover the incorrect key, not the correct key. Test operations may also be affected by such a defense. Exemplary test operations will be discussed herein below.

Exemplary Security Implications of the Exemplary Defense

An oracle made dishonest by the exemplary defense can be of no or very little use for logic locking attacks: most of the earlier attacks may no longer be applicable as they all can rely heavily on an accurate oracle and its test access. An exemplary list of the attacks can include, e.g., the Sensitization (see. e.g., Reference 10), SAT (see. e.g., Reference 11), AppSAT (see, e.g., Reference 12), Double-DIP (see. e.g., Reference 13), Bypass (see. e.g., Reference 14), and Fall (see. e.g., Reference 15). These oracle-reliant attacks have encouraged researchers to develop effective defenses against some of them, for example, SARLock (see. e.g., Reference 19), AntiSAT (see. e.g., Reference 20), and SFLL (see. e.g., Reference 21). However, these researches were limited by trade-offs. For example, in order to gain resilience against these attacks, in the past, the researchers had to compromise various important security features, such as, e.g., error-rate or output corruption measures which can provide a high level of failures when an incorrect key is applied to the logic-locked circuit. (See. e.g., Reference 24). Defenses developed to thwart the oracle-reliant attacks may suffer from low error-rates. As a result, even incorrect keys may end up producing correct outputs for most of the inputs. The exemplary system, method, computer-accessible medium, and circuit, according to an exemplary embodiment of the present disclosure, makes such an unpleasant trade-off moot by crippling the oracle, and thus, all the oracle-reliant attacks.

The oracle can only be accurate if it can be used without its test/scan access (see. e.g., Reference 16): such attacks may not be successful however, as designs can be mostly controlled by the flip-flops and minimally by the primary inputs.

The attackers can then be left with only one feasible option, e.g., use the netlist of the logic-locked design without an oracle. Oracle-less attacks do exist in the literature (see. e.g., References 17 and 18) but they mostly target the recent logic locking defenses, for example, SARLock, Anti-SAT, and SFLL, etc. (see. e.g., References 19, 20, 21, etc.) that were developed to thwart the oracle-reliant attacks. These attacks can all be variants of the removal attack that analyzes a netlist and removes the circuitry that implements logic locking defense.

These removal attacks may not be effective on earlier logic locking defenses such as Random Logic Locking (RLL) (see. e.g., Reference 22) or Fault-analysis-based Logic Locking (FLL) (see. e.g., Reference 23), as these defenses do not follow a specific structure that can easily be identified by netlist analysis. These earlier defenses can also be superior to the latest logic defenses as they deliver high levels of error-rate or corruption. (See. e.g., Reference 24). For example, only the existence of an accurate oracle may undermine these earlier defenses, which the exemplary system, method, computer-accessible medium, and circuit can thwart. Therefore, one of these high-corruption defenses, for example, RLL or FLL, with some modifications can make a good partner for the exemplary defense.

According to the exemplary system, method, computer-accessible medium, and circuit, according to an exemplary embodiment of the present disclosure, the correct key can be loaded on the tamper-proof memory any time after fabrication, for example, before or after manufacturing testing. Even if the correct key has been loaded on the chips prior to manufacturing testing, this poses no security threat as the correct key may not be accessed through the scan interface. The exemplary defense can be effective in protecting the correct key from the untrusted test facilities as well. In the absence of the exemplary defense, some exemplary systems were loaded with the correct key after manufacturing testing had been completed. (See. e.g., Reference 26). However, the exemplary defense can reduce or eliminate such logistical complexity. The exemplary circuitry added around a design locked by a high-corruption locking technique can thwart all logic locking attacks regardless of whether the attacker can be in the foundry, test facility, an end-user, or a combination of thereof colluding together.

Exemplary Test Implications of the Exemplary Defense

The exemplary system, method, computer-accessible medium, and circuit according to the exemplary embodiments(s) of the present disclosure can be beneficial since manufacturing test of a chip can be carried out even when the design functionality can be reconfigured into an incorrect one. Manufacturing tests can be structural tests that are designed to uncover structural defects. (See. e.g., Reference 25). So long as the testing can be performed with the same level of fault coverage, structural testing of the chip that represents the dishonest oracle for defects can be no different than testing the accurate oracle for defects: functionality can be irrelevant during structural testing.

For example, test patterns can be generated based on a fault model that represents a class of defects. So long as the automatic test pattern generation ("ATPG") can be performed with the same functionality as the incorrect functionality that the chips can be reconfigured into during testing (e.g., based on the swapping of the correct key for the incorrect key), in one example embodiment, the generated test patterns can detect the targeted faults/defects. Using the exemplary system, method, computer-accessible medium, and circuit, according to the exemplary embodiment(s) of the present disclosure, upon detecting the use of scan chains, it is possible to force the chips into an incorrect mode (or functionality): the ATPG process can assume the same incorrect functionality in generating the test patterns. These patterns can therefore be valid during the manufacturing test of the chips despite the incorrect functionality they can be configured into.

The exemplary system, method, computer-accessible medium, and circuit, according to an exemplary embodiment of the present disclosure, can then utilize a particular incorrect key to generate the test patterns for a design: picking an incorrect key means picking an incorrect functionality to reconfigure the design during testing. While the choice of an incorrect key has an impact on the fault coverage, this impact can be minimal. An incorrect key can thus be selected arbitrarily. In an exemplary embodiment, the incorrect can be selected to be the reset state of the key register for, e.g., simplicity. In another exemplary embodiment, the incorrect key can be selected for each test pattern by the ATPG tool; e.g., the tool can select the best incorrect key for each test pattern to maximize fault coverage and/or minimize test pattern count. In the latter exemplary embodiment, chips can be tested with a different incorrect key for each test pattern. The incorrect key(s), along with the test patterns, can be provided to the testing facility. During manufacturing testing of each chip according to an example embodiment of the present disclosure, the incorrect key(s) can be loaded on the chip along with the test patterns through the test/scan access; then the test patterns can be applied to the chip. It can be as if the chips can be unlocked with the incorrect key(s) for testing. Furthermore, with an exemplary design-for-test structure being in place, the incorrect key can be made part of each test pattern, and can be loaded on the chip together with the test pattern. Then, every test pattern can have a different incorrect key, which can facilitate the detection of more faults.

The exemplary system, method, computer-accessible medium, and circuit, according to an exemplary embodiment of the present disclosure, can include a primary key (e.g., correct key) and a secondary key (e.g., incorrect key). The primary key can be the key which enables the chip to function properly during its normal operating mode. The secondary key can be the key(s) which enables the chip to be tested during its testing mode but may not enable normal operation of the chip.

Exemplary Architecture

As shown in FIG. 1, the exemplary architecture/system 100 according to an exemplary embodiment of the present disclosure can include a test access detection circuitry 110 and a functionality reconfiguration circuitry 120. The exemplary test access detection circuitry 110 can include an OR gate 113 and a sticky flip-flop or latch 114. The exemplary test access detection circuitry 110 can receive a scan-enable signal 111, and may transmit a "corrupt" signal 112 whenever the scan-enable signal 111 is HIGH. The scan-enable signal 111 can be set to HIGH whenever scan chains 140 can be loaded/unloaded. The exemplary test access detection circuitry 110 can use a sticky flip-flop 114 (or a latch) to provide and/or transmit the corrupt signal 112 after the scan-enable signal 111 is received, which can mark the first attempt to access the scan chains 140.

The functionality reconfiguration circuitry 120 can multiplex an incorrect key 122 (or a wrong key 122) with a correct key 121. The multiplexing is performed by the multiplexer 123 based on the corrupt signal 112. The incorrect key 122 can be the reset state of a register or any key value loaded by the chip-user on the chip. The logic-locked design 130 can then be driven by either the correct key 121 or the incorrect key 122. The correct key 121 can be effectively disconnected from the logic-locked design 130 when the corrupt signal 112 is transmitted to the key register 123. The corrupt signal 112 can be cleared only at power up: once a test access can be detected, the chip can be configured into the incorrect functionality until the chip may be powered off.

Figure 2:
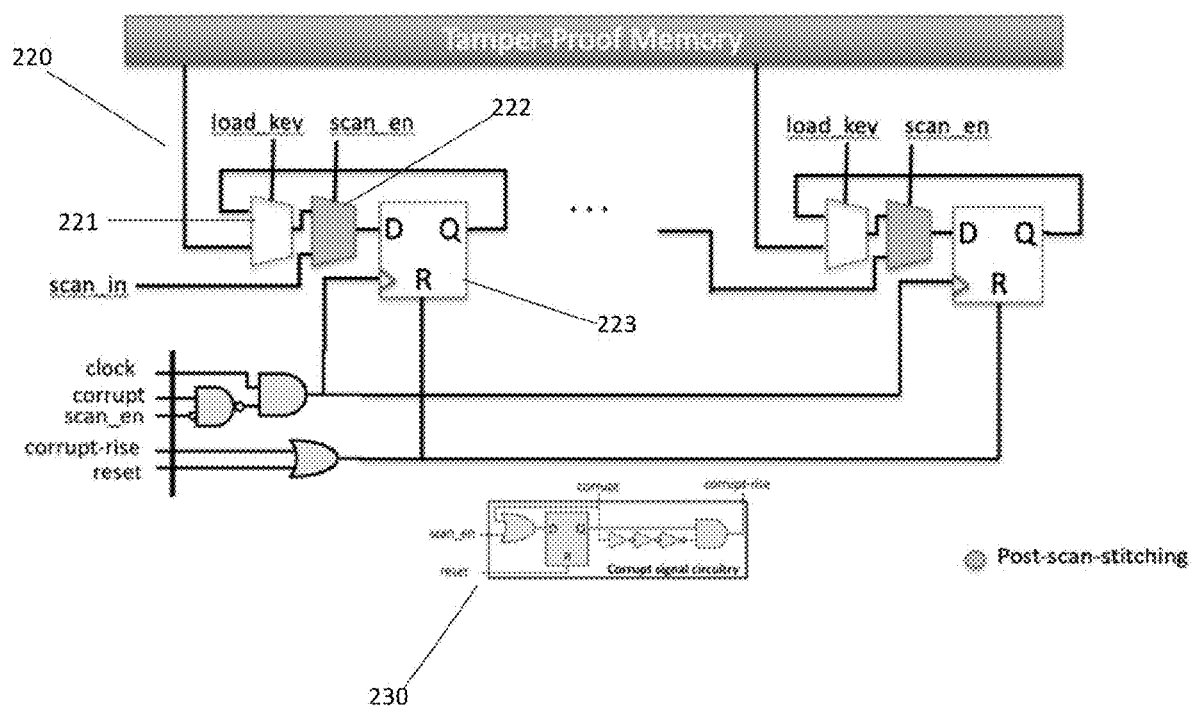
FIG. 2 is a schematic diagram of an exemplary key register according to an exemplary embodiment of the present disclosure.

FIG. 2 shows a schematic diagram of the key register 220 according to an exemplary embodiment of the present disclosure. The key register 220 can include key multiplexers 221, scan multiplexers 222, and key flip-flops 223, and can be used to load the correct key from the tamper-proof memory (e.g., the load key signal can be asserted for such exemplary situation) or the incorrect/wrong key through the scan-in port serially or by resetting the key register 220. The key register 220 can be a shift register, and/or can function in a similar manner to a shift register, e.g., with load capability. Generally, the correct key can drive the logic-locked design from the key register 220. However, when the corrupt signal circuitry 230 senses the scan-enable signal to be HIGH, the key register 220 is reset, producing an incorrect key (the reset state of the register) to drive the logic-locked design, reconfiguring the logic-locked design into an incorrect functionality. In addition, as long as the scan-enable signal remains HIGH, the key register 220 can be loaded serially through the scan-in port by the chip user with any incorrect key. In an exemplary embodiment, the only way to configure the chip back into the correct functionality mode can be by power-resetting the chip, and thus, clearing the signals generated by the corrupt signal circuitry 230.

According to the exemplary system, method, computer-accessible medium, and circuit, according to an exemplary embodiment of the present disclosure, the functionality of the logic-locked design 130 in FIG. 1 can be denoted as $f$. Then, for example:

$O_{correct} = f(I, K_{correct})$
$O_{wrong} = f(I, K_{wrong})$ where $O_{correct}$ and $O_{wrong}$ can denote the output of the logic-locked design 130 for the correct and the incorrect mode (or functionality) in response to the use of $K_{correct}$ and $K_{wrong}$ which can denote the correct key 121 and the incorrect key 122, respectively. I can denote the inputs.

The exemplary architecture can generate $O_{correct}$ during its mission mode so long as the scan-enable signal 111 is not received (e.g., LOW), and thus, the scan chains 140 may not be accessed. When the scan-enable signal 111 is received (e.g., HIGH), the design can switch to $O_{wrong}$. In one exemplary embodiment of the present disclosure, the function $f$ can operate, as described above, during manufacturing testing or any time when the end-user of the chip attempts to access the scan chains 140. With the exemplary architecture around the logic-locked circuit in place, any attack that uses the working chip as an oracle by accessing its test interface ends up retrieving the incorrect key 122 (e.g., $K_{wrong}$), and not the correct key 121 (e.g., $K_{correct}$). The same $K_{wrong}$, or the same set of $K_{wrong}$, can be used during the ATPG process and during the manufacturing testing. As the key register 220 content in FIG. 2 can be set freely during the test, ATPG can choose a different $K_{wrong}$ for each test pattern. Thus, the key register can function as a set of test points, which can be used to maximize fault coverage.

Exemplary Mission Mode Debug Implication

Generally, scan chains can be used to perform the debug of mission mode failures as well. With the exemplary defense on chips, $K_{correct}$ can be used as the incorrect key in debugging mission mode failures: $K_{wrong}$ can be set to $K_{correct}$. The chip under debug can then be configured into $O_{correct}$, which can be utilized to expose the failure, and help facilitate a proper failure analysis, even with test/scan access. The debug can be performed in a secure facility (e.g., design house), where $K_{correct}$ can be known and used. The exemplary debugger can shift in $K_{correct}$ into the key register while shifting in the desired state into the scan cells all through the scan-in port(s), perform functional operations for multiple cycles with the correct key in place, and shift out the scan chain content through the scan-out port(s).

Exemplary Attack: Make the Most of the Crippled Oracle

In the exemplary system, method, computer-accessible medium, and circuit, according to an exemplary embodiment of the present disclosure, the last scan chain content during functional operations can be shifted out by setting the scan-enable signal. At that point, the incorrect key can start controlling the combinational circuit, but the final scan chain content, right before the test operations, can be retained intact, and can be shifted out for analysis.

An attacker may potentially exploit this capability. In particular, the attacker may (i) reset the entire chip to bring the flip-flops to the initial functional state, (ii) capture the combinational circuit's response in the initial state and to the primary input pattern of the attacker's choice in the scan chains, (iii) set the scan-enable signal, and (iv) shift out the scan chain content through the scan-out ports for analysis. The attacker may then power-off and power-on the chip, and repeat the same attack with another primary input pattern of attacker's choice.

With this attack capability in mind, the attacker may execute a constrained version of the well-known sensitization or the SAT attack, where the attacker is free to set the primary input pattern but may tie the scan cells to the initial state of the finite state diagram corresponding to the circuit. The attacker may apply these generated primary input patterns, as explained above, and may collect the scan responses. The analysis of the scan responses may lead to the deciphering of some of the key bits. Exemplary experiments indicate that 27-47% of the key bits may be leaked by such an attack, and thus, a fix may be implemented for this vulnerability.

Exemplary Disabling the Oracle

To, e.g., thwart the attack described above, the exemplary system, method, computer-accessible medium, and circuit, according to an exemplary embodiment of the present disclosure, can be enhanced with a module that can selectively mask the output of the scan chains. This "scan-out blocking circuitry" can mask the scan-out ports for n clock cycles after the first time a change on scan-enable signal can be detected (e.g., test access detection), where n can be the scan depth. In such a manner, the attacker can observe nothing for n cycles after the first time the scan-enable can be set. If the scan-enable remains set during this time, scan cells can shift: otherwise, the scan cells can capture the combinational circuit response with the incorrect key driving the functional operations. In either case, the scan chain content that the attacker aims to shift out can be corrupted.

Figure 3:
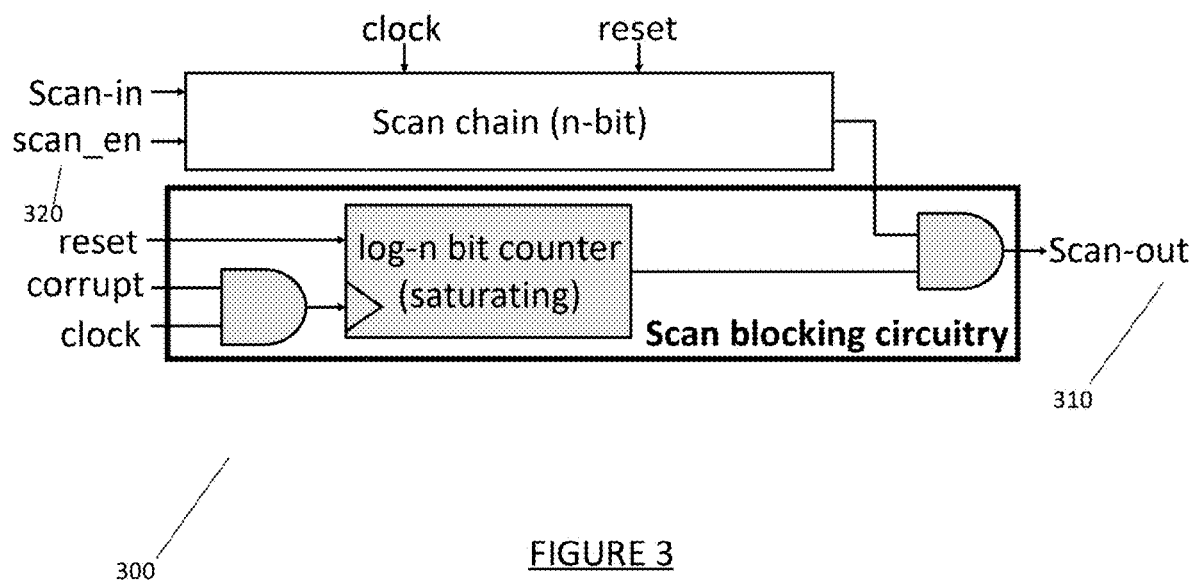
FIG. 3 is a schematic diagram of an exemplary scan-out blocking circuitry according to an exemplary embodiment of the present disclosure.

FIG. 3 is a schematic diagram of an exemplary scan-out blocking circuitry 300 according to an exemplary embodiment of the present disclosure. An exemplary scan-out blocking circuitry 300 can include a counter which gates the scan-out ports 310. This counter can be reset together with the functional flip-flops upon power-up, and can count up with every clock pulse upon the first time a change on scan-enable signal 320 can be detected. Until the counter reaches n−1, it outputs a 0, and thus, the exemplary scan-out blocking circuitry 300 can block the scan-out ports 310.

Afterwards, the exemplary scan-out blocking circuitry 300 can output 1, facilitating the scan-out ports 310 to be observed, until the chip is power-reset.

The blocking of the scan-out observation during the first n cycles after scan-enable can be set can have no impact on the manufacturing testing process, as the scan-out data during the first n cycles can be discarded anyways.

Exemplary Cost of the Exemplary Defense

Additional circuitry that the exemplary defense may insert into every chip mainly can include the register that holds the correct and/or incorrect key and the set of multiplexers (e.g., in addition to the sticky flip-flop/latch). For 128-bit logic-locking, the cost can be roughly 129 flip-flops and 256 multiplexers. If the scan-out blocking circuitry is utilized as well, the additional cost can be that of a lg(n)-bit counter. For a large microprocessor or System-on-Chip ("SOC") design, this cost can be negligible. Furthermore, as the corrupt signal can be mainly static (e.g., it can be 0) in mission mode and 1 in test mode), and so can the incorrect and correct keys, and the counter can be mainly static (e.g., as it may not count in mission mode), the added circuitry can consume negligible dynamic power. Additionally, the added circuitry does not lie on the critical paths of the design, incurring no performance penalty. The correct key can be retained intact throughout the lifetime of the chip, and can be static as a result.

The exemplary defense can lead to a minor fault coverage loss. The faults on the paths from the tamper-proof memory that holds the correct key to the multiplexers can remain untested by the structural test patterns as the corrupt signal can be HIGH during test. To remedy this, functional testing can be used to top up the structural test, recovering some of the fault coverage loss. Functional test may only be performed after the correct key has been loaded on the chips and without using the test/scan access. Any fault that corrupts the correct key can (e.g., a fault that can be stuck at the opposite value of the key bit) can be detected by a simple functional test. Another benefit of using a high error-rate logic locking procedure can be that any error in the key can reflect on the outputs.

Exemplary Logic Locking Implementation to Partner with the Exemplary Defense

As described above, an exemplary (dishonest oracle) defense can be added as a layer of protection around a logic-locked design to protect the logic locking key from attacks. In an example embodiment, the exemplary logic locking technique can be used to transform a given logic design into a logic-locked design by making changes in the logic design. The exemplary logic locking technique is an advantageous partner for the exemplary dishonest oracle defense. A given logic design is first locked by using the exemplary logic locking technique to create a logic-locked design, which is then integrated with the exemplary dishonest oracle defense. The exemplary two-layer defense protects the chips against all known and anticipated logic locking attacks.

An exemplary high-corruption logic locking procedure protected by the exemplary defense can be used to thwart some or all attacks. An exemplary implementation can be designed that can be resilient to removal attacks, where the only available information for an attack can be the logic-locked netlist to analyze in inferring the correct key: the exemplary dishonest oracle defense disables the oracle anyway. For example, key-gate insertion decisions can be randomized without relying on any logic synthesis tool, leaving no traces or patterns whatsoever to any machine or human learning analysis efforts on the locked netlist In the exemplary system, method, computer-accessible medium, and circuit, according to an exemplary embodiment of the present disclosure, a hardware design netlist to lock (e.g., referred to as the original design) can be provided, and the logic-locked netlist can be produced. The original design can be a sequential circuit: the combinational part of it can be locked. To implement K-bit logic locking, K1 locations can be randomly selected in the original design where there can be an inverter and K2 locations where there can be no inverter, where K1+K2=K. The first set of locations can be denoted as $S_i$ and the second set of locations can be denoted as $S_b$. The locations can be randomly partitioned in $S_i$ into two possibly unequal-sized sets, $S_{i1}$ and $S_{i2}$, and the locations in $S_b$ into two possibly unequal-sized sets, $S_{b1}$ and $S_{b2}$.

Figure 4:
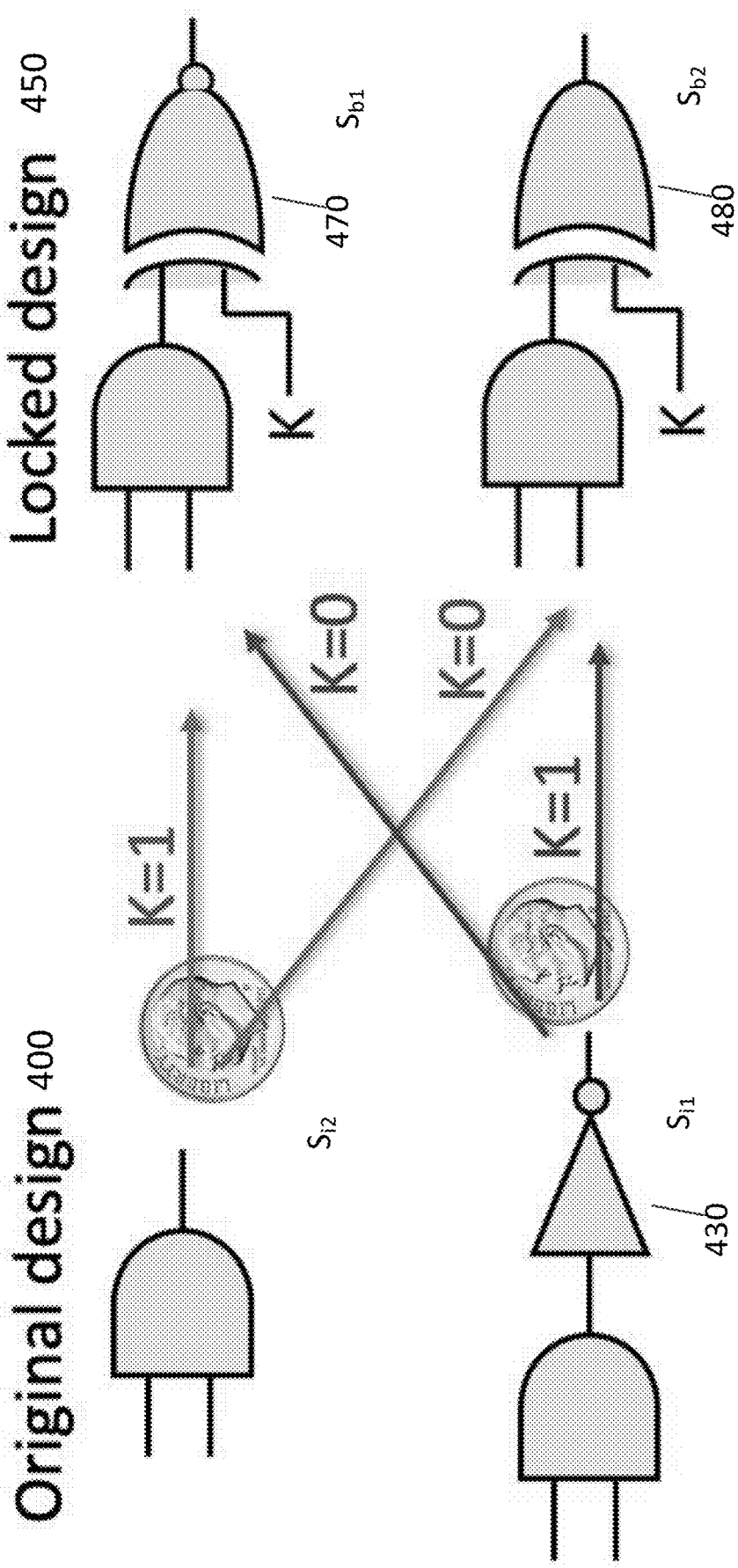
FIG. 4 is a schematic diagram of an exemplary production process for a logic-locked design according to an exemplary embodiment of the present disclosure.

FIG. 4 shows a schematic diagram of an exemplary production process for a logic-locked design according to an exemplary embodiment of the present disclosure. The exemplary logic-locked design 450 can be produced from the original design 400 as follows. In the locations in $S_{i1}$, each inverter 430 can be replaced with an XOR key-gate 480. In the locations in $S_{i2}$, each inverter can be replaced with an XNOR key-gate 470. In the locations in $S_{b1}$, an XNOR key-gate 470 can be inserted. In the locations in $S_{b2}$, an XOR key-gate 480 can be inserted.

The correct key-bit for each of the key-gates inserted in locations in $S_{i2}$ and $S_{b2}$ can be a 0, while it can be 1 for each of the key-gates inserted in locations in $S_{i1}$ and $S_{b1}$. When this correct key can be applied to the exemplary logic-locked design, it can be functionally equivalent to the original design. Further, a netlist analysis to identify the correct key bits corresponding to the key-gates may perform no better than random-guessing. It can be assumed that the attacker can identify the key-gates in the logic-locked design netlist: the attacker can trace the connections from the tamper-proof memory. If an XOR key-gate can be encountered, it can belong to $S_{i1}$ or $S_{b2}$; in the former case, the correct key bit can be 1 while it can be 0 in the latter case. If an XNOR key-gate can be encountered, it can belong to $S_{i2}$ or $S_{b1}$; in the former case, the correct key bit can be 0) while it can be 1 in the latter case. Consequently, the netlist structure can leak no information about the correct key bits whatsoever. This particular implementation of logic locking, by construction, can be resilient to removal attacks. It can be referred to as the Truly Random Logic Locking (TRLL) technique. It should be noted that there may be no reliance on any CAD (e.g., synthesis) tools for secure implementation. Any subsequent logic synthesis operation to perform optimizations on the logic-locked design can still retain the security properties, as the synthesis tools can be blind to the correct key information: only the designer who applied the exemplary TRLL technique to create the logic-locked netlist from the original netlist knows the correct key.

In some exemplary embodiments of the present disclosure, a logic locking hardware design and method can include test access detection circuitry and functionality reconfiguration circuitry to intentionally change the functionality of a logic-locked circuit by replacing the correct key with an incorrect key after test access can be detected, in order to test the logic-locked chips with an incorrect functionality. The functionality reconfiguration circuitry can be used to provide either the correct key of logic-locked circuit or an incorrect key to drive the key input of the logic-locked circuit. Upon detecting a change on the scan chain control signal(s), the functionality reconfiguration circuitry can force a selection of an incorrect key, changing the functionality of the logic-locked circuit to an incorrect functionality.

Figure 5:
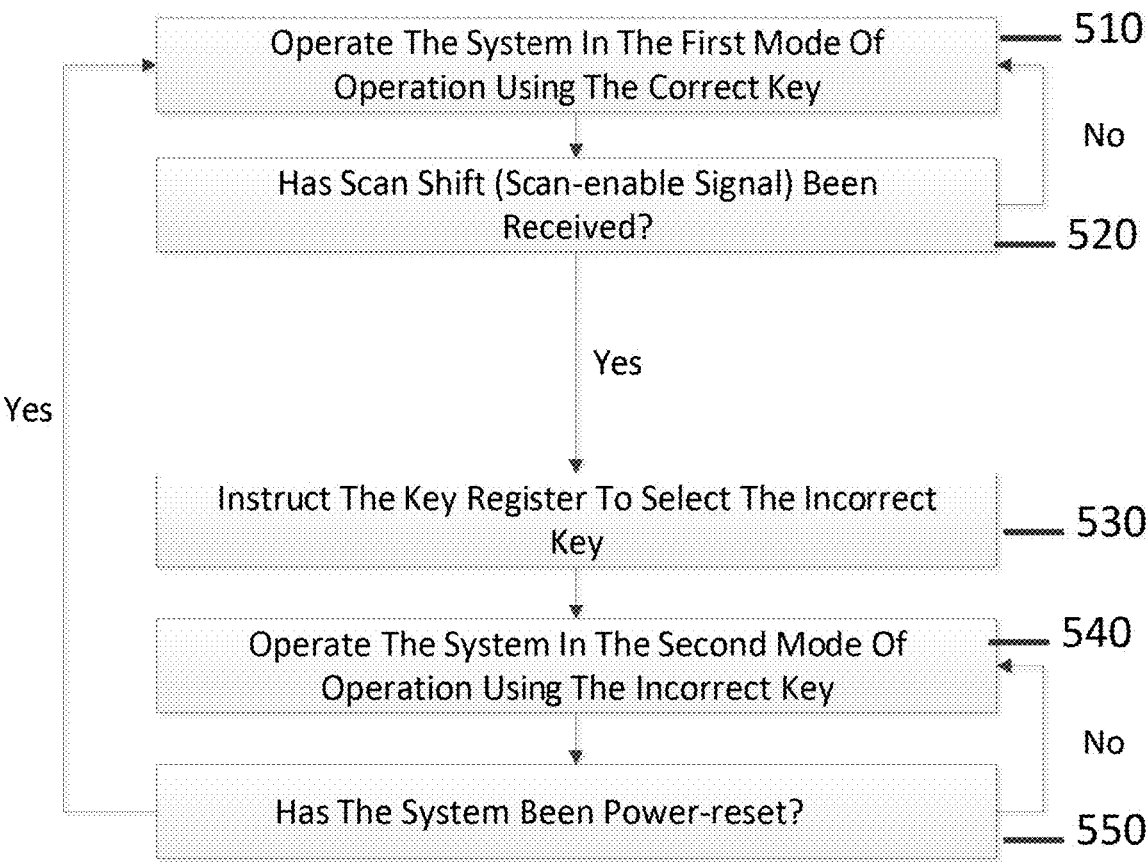
FIG. 5 is an exemplary flow diagram of a method according to an exemplary embodiment of the present disclosure.

FIG. 5 is an exemplary flow diagram of a method according to an exemplary embodiment of the present disclosure. In some exemplary embodiments of the present disclosure, a logic locking hardware method 500 can include step/procedure 510 for powering up the chip and initiating the system using a correct key. For example, in a first mode of operation of the logic locking hardware, upon powering up, a correct key can be used to drive a logic-locked circuit. In step/procedure 520, the logic locking hardware can monitor the scan-enable signal, and if it is HIGH, the logic locking hardware can instruct a key register to select an incorrect key for another mode of operation of the logic locking hardware in step/procedure 530. In step/procedure 540, the logic locking hardware can operate in a second mode of operation. In step/procedure 550, the logic locking hardware can determine whether the chip has been power-reset. If so, the step/procedure 510 can be repeated; otherwise, the step/procedure 540 can be repeated.

The exemplary method according to an exemplary embodiment of the present disclosure can include (i) randomly picking a location(s) (e.g., denoted as $S_i$) in the original design where there can be an inverter(s) and another location(s) (e.g., denoted as $S_b$) where there can be no inverter. The locations in $S_i$ can be randomly partitioned into two sets, $S_{i1}$ and $S_{i2}$, and the locations in $S_b$ can also be randomly partitioned into two sets, $S_{b1}$ and $S_{b2}$. In the locations in $S_{i1}$, the inverter(s) can be replaced with an XOR key-gate(s). In the locations in $S_{i2}$, the inverter(s) can be replaced with an XNOR key-gate(s). In the locations in $S_{b1}$, an XNOR key-gate(s) can be inserted. In the locations in $S_{b2}$, an XOR key-gate can be inserted. One input of the key-gates(s) can be driven by the netlist in the original design and another input of the key-gate(s) can be driven by the key bits.

Figure 6:
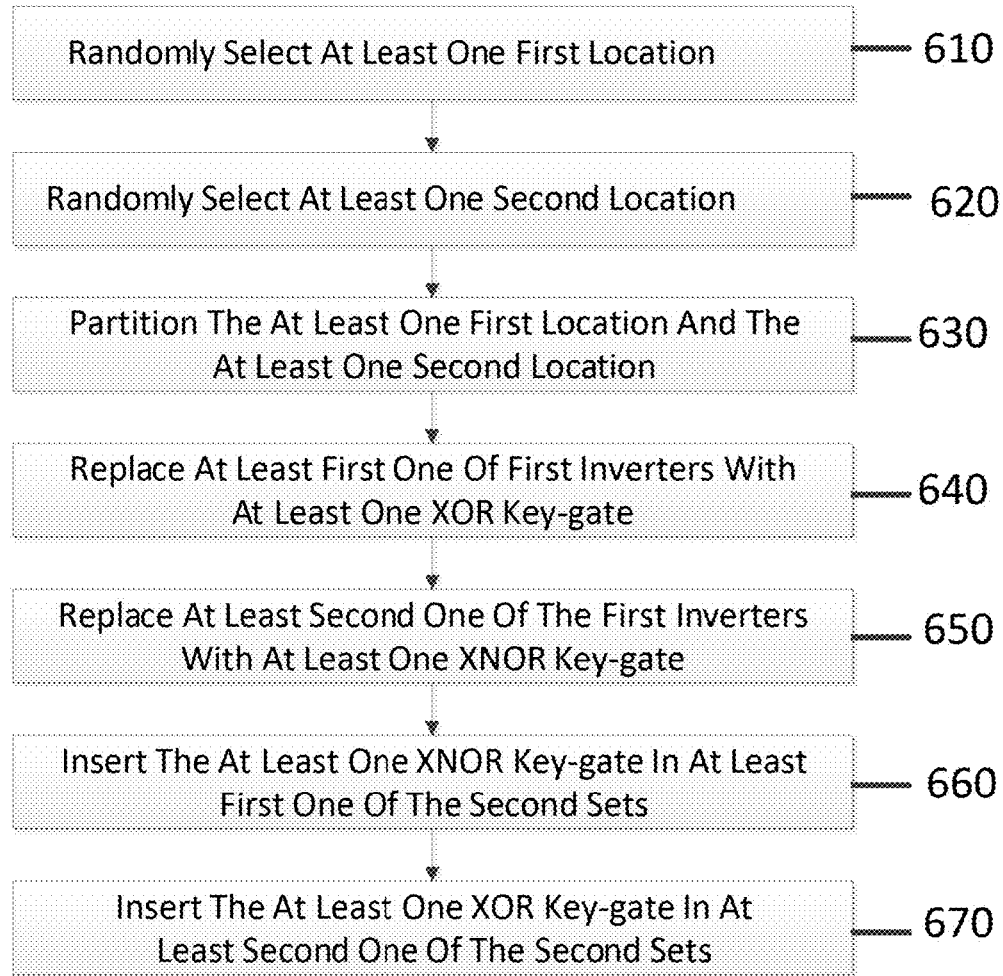
FIG. 6 is an exemplary flow diagram of a logic locking method according to an exemplary embodiment of the present disclosure.

FIG. 6 is an exemplary flow diagram of a method according to an exemplary embodiment of the present disclosure. Some exemplary embodiments of the present disclosure can include a method 600 for providing at least one logic-locked design. The method can randomly select, in procedure 610, at least one first location at a first portion in a logic design which includes first inverters. The method can randomly select, in procedure 620, at least one second location at a second portion in the logic design which excludes at least one second inverter. In a procedure 630, the at least one first location can be randomly partitioned into at least two first sets, and the at least one second location can be randomly partitioned into at least two second sets. In a procedure 640, at least first one of first inverters in the at least first one of the first sets can be replaced with at least one XOR key-gate. In a procedure 650, at least second one of the first inverters in at least second one of the first sets can be replaced with at least one XNOR key-gate. In a procedure 660, the at least one XNOR key-gate can be inserted in at least first one of the second sets. In a procedure 670, the at least one XOR key-gate can be inserted in at least second one of the second sets thereby providing the at least one logic-locked design.

Figure 7:
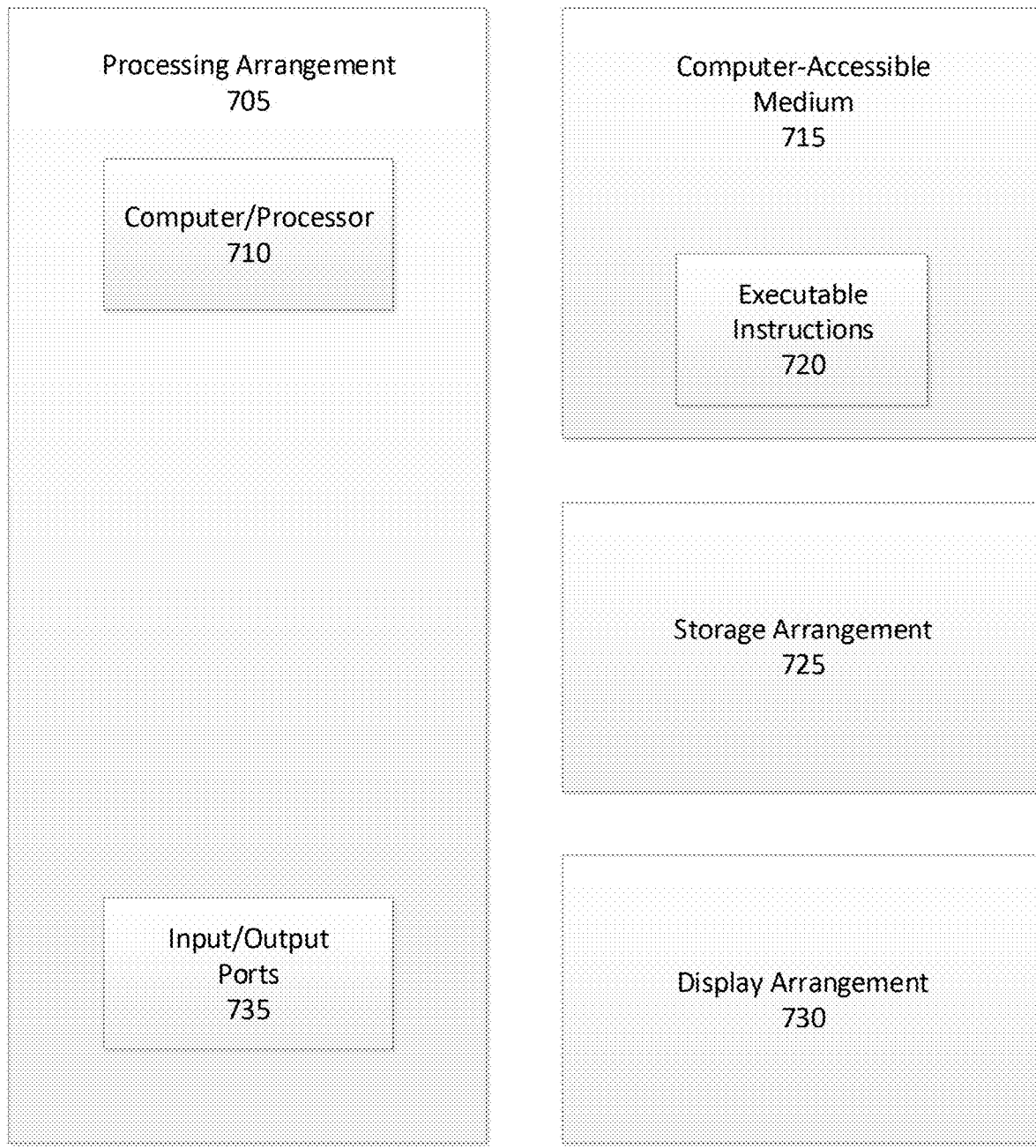
FIG. 7 is an illustration of an exemplary block diagram of an exemplary system in accordance with certain exemplary embodiments of the present disclosure.

FIG. 7 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 705. Such processing/computing arrangement 705 can be, for example entirely or a part of, or include, but not limited to, a computer/processor 710 that can include, for example one or more microprocessors, and use instructions stored on a computer-accessible medium (e.g., RAM, ROM, hard drive, or other storage device).

As shown in FIG. 7, for example a computer-accessible medium 715 (e.g., as described herein above, a storage device such as a hard disk, floppy disk, memory stick, CD-ROM, RAM, ROM, etc., or a collection thereof) can be provided (e.g., in communication with the processing arrangement 705). The computer-accessible medium 715 can contain executable instructions 720 thereon. In addition or alternatively, a storage arrangement 725 can be provided separately from the computer-accessible medium 715, which can provide the instructions to the processing arrangement 505 so as to configure the processing arrangement to execute certain exemplary procedures, processes, and methods, as described herein above, for example.

Further, the exemplary processing arrangement 705 can be provided with or include an input/output ports 735, which can include, for example a wired network, a wireless network, the internet, an intranet, a data collection probe, a sensor, etc. As shown in FIG. 7, the exemplary processing arrangement 705 can be in communication with an exemplary display arrangement 730, which, according to certain exemplary embodiments of the present disclosure, can be a touch-screen configured for inputting information to the processing arrangement in addition to outputting information from the processing arrangement, for example. Further, the exemplary display arrangement 730 and/or a storage arrangement 725 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference, in their entireties:
1. [LLbook] M. Yasin, J. J. Rajendran, and O. Sinanoglu, A Brief History of Logic Locking. Cham: Springer International Publishing, 2020, pp. 17-31. [Online].
2. [LLTM] J. Rajendran, Y. Pino, O. Sinanoglu, and R. Karri, "Security analysis of logic obfuscation," in Proc. 49th Annu. Design Automation Conf (DAC), June 2012, pp. 83-89.

3. [Rev1] "Intel's 22-nm trigate transistors exposed," 2012. [Online]. Available: http://electroiq.com/chipworks-real-chips-blog/2012/04/24/intels-22-nm-trigate-transistors-exposed
4. [Rev2] "iPhone 5 A6 SoC reverse engineered, reveals rare hand-made custom CPU, and tri-core GPU," 2012. [Online]. Available: http://www.extremetech.com/computing/136749-iphone-5-a6-soc-reverseengineered-reveals-rare-hand-made-custom/-cpu-and-a-tri-core-gpu
5. [Scanlock1] R. Karmakar et al., "Encrypt Flip-Flop: A Novel Logic Encryption Technique For Sequential Circuits," arXiv preprint arXiv: 1801.04961, 2018.
6. [Scanlock2] U. Guin et al., "Robust design-for-security architecture for enabling trust in IC manufacturing and test," TVLSI, vol. 26, no. 5, pp. 818-830, 2018.
7. [Scanlock3] X. Wang et al., "Secure scan and test using obfuscation throughout supply chain," TCAD, vol. 37, no. 9, pp. 1867-1880, 2017.
8. [Scanlock4] R. Karmakar et al., "A Scan Obfuscation Guided Design-for-Security Approach For Sequential Circuits," TCAS II: Express Briefs, 2019.
9. [Scanunlock] L. Alrahis et al., "ScanSAT: Unlocking Static and Dynamic Scan Obfuscation," TETC, pp. 1-1, 2019.
10. [Sensitization] M. Yasin et al., "On improving the security of logic locking," TCAD, vol. 35, no. 9, pp. 1411-1424, 2016.
11. [SAT] P. Subramanyan et al., "Evaluating the security of logic encryption algorithms," in HOST. IEEE, 2015, pp. 137-143.
12. [AntiSAT] K. Shamsi et al., "AppSAT: Approximately deobfuscating integrated circuits," in HOST. IEEE, 2017, pp. 95-100.
13. [DoubleDIP] Y. Shen and H. Zhou, "Double DIP: Re-evaluating security of logic encryption algorithms," in GLSVLSI. ACM, 2017, pp. 179-184.
14. [Bypass] X. Xu et al., "Novel bypass attack and BDD-based tradeoff analysis against all known logic locking attacks," in CHES. Springer, 2017, pp. 189-210.
15. [FALL] D. Sirone and P. Subramanyan, "Functional analysis attacks on logic locking," in DATE. IEEE, 2019, pp. 936-939.
16. [Noscan] M. El Massad et al., "Reverse engineering camouflaged sequential circuits without scan access," in ICCAD. IEEE/ACM, 2017, pp. 33-40.
17. [Removal 1] M. Yasin et al., "Removal Attacks on Logic Locking and Camouflaging Techniques," TETC, pp. 1-1, 2017.
18. [Removal2] F. Yang et al., "Stripped Functionality Logic Locking With Hamming Distance-Based Restore Unit (SFLL-hd)-Unlocked," TIFS, vol. 14, no. 10, pp. 2778-2786, 2019.
19. [SARLock] M. Yasin et al., "SARLock: SAT attack resistant logic locking," in HOST. IEEE, 2016, pp. 236-241.
20. [AntiSAT] Y. Xie and A. Srivastava, "Anti-sat: Mitigating sat attack on logic locking," TCAD, vol. 38, no. 2, pp. 199-207, 2019.
21. [SFLL] M. Yasin et al., "Provably-secure logic locking: From theory to practice," in CCS. ACM, 2017, pp. 1601-1618.
22. [RLL] J. Roy et al., "Ending Piracy of Integrated Circuits," Computer, vol. 43, no. 10, pp. 30-38, 2010.
23. [FLL] J. Rajendran et al., "Fault analysis-based logic encryption," TCOMP, vol. 64, no. 2, pp. 410-424, 2015.
24. [SFLLfault] A. Sengupta, M. Nabeel, N. Limaye, M. Ashraf, and O. Sinanoglu, "Truly stripping functionality for logic locking: A fault-based perspective," IEEE Trans. Comput.-Aided Design Integr. Circuits Syst., pp. 1-1, 2020.
25. [Testbook] M. Bushnell and V. D. Agrawal, Essentials of electronic testing fordigital, memory and mixed-signal VLSI circuits. Springer Science &Business Media, 2000, vol. 17.
26. [Untrustedtest] M. Yasin et al., "Activation of logic encrypted chips: Pre-test or posttest?" in DATE. EDA Consortium, 2016, pp. 139-144.

What is claimed is:

1. A non-transitory computer-accessible medium having stored thereon computer-executable instructions for providing at least one logic-locked integrated circuit (IC) design, wherein, when a computing arrangement executes the instructions, the computing arrangement is configured to perform procedures comprising:
   randomly selecting at least one first location at a first portion in a logic design which includes first inverters;
   randomly selecting at least one second location at a second portion in the logic design which excludes at least one second inverter;
   randomly partitioning the at least one first location into at least two first sets, and the at least one second location into at least two second sets;
   replacing at least first one of the first inverters in at least first one of the first sets with at least one XOR key-gate;
   replacing at least second one of the first inverters in at least second one of the first sets with at least one XNOR key-gate;
   inserting the at least one XNOR key-gate in at least first one of the second sets; and
   inserting the at least one XOR key-gate in at least second one of the second sets.

2. The computer-accessible medium of claim 1, wherein:
   at least one first input of the at least one XOR key-gate or at least one first input of the at least one XNOR key-gate is driven by a net in the logic design, and
   at least one second input of the at least one XOR key-gate or at least one second input of the at least one XNOR key-gate is driven by logic locking key bits, thereby providing the at least one logic-locked IC design.

3. The computer-accessible medium of claim 2, wherein the logic locking key bits include (i) a correct key which is configured to unlock at least one logic-locked IC design and (ii) an incorrect key which is configured to corrupt at least one output of the at least one logic-locked IC design.

4. A method for providing at least one logic-locked integrated circuit (IC) design, comprising:
   randomly selecting at least one first location at a first portion in a logic design which includes first inverters;
   randomly selecting at least one second location at a second portion in the logic design which excludes at least one second inverter;
   randomly partitioning the at least one first location into at least two first sets, and the at least one second location into at least two second sets;
   replacing at least first one of the first inverters in at least first one of the first sets with at least one XOR key-gate;
   replacing at least second one of the first inverters in at least second one of the first sets with at least one XNOR key-gate;
   inserting the at least one XNOR key-gate in at least first one of the second sets; and
   inserting the at least one XOR key-gate in at least second one of the second sets.

5. A system for providing at least one logic-locked integrated circuit (IC) design, comprising:
a computer hardware arrangement configured to:
randomly select at least one first location at a first portion in a logic design which includes first inverters;
randomly select at least one second location at a second portion in the logic design which excludes at least one second inverter;
randomly partition the at least one first location into at least two first sets, and the at least one second location into at least two second sets;
replace at least first one of the first inverters in at least first one of the first sets with at least one XOR key-gate;
replace at least second one of the first inverters in at least second one of the first sets with at least one XNOR key-gate;
insert the at least one XNOR key-gate in at least first one of the second sets; and
insert the at least one XOR key-gate in at least second one of the second sets.

* * * * *